Nov. 9, 1926.

G. E. BARNHART 1,606,494

HEATER

Filed May 25, 1925

Inventor

George E. Barnhart

By A. B. Bowman

Attorney

Patented Nov. 9, 1926.

1,606,494

UNITED STATES PATENT OFFICE.

GEORGE E. BARNHART, OF PASADENA, CALIFORNIA, ASSIGNOR OF ONE-HALF TO MURRAY S. ELTON, OF PASADENA, CALIFORNIA.

HEATER.

Application filed May 25, 1925. Serial No. 32,580.

My invention relates to heaters, more particularly for heaters placed in a room for heating the air in the same room, and the objects of my invention are:

First, to provide a heater for heating the air in a room in which the outside surface is relatively cool; second, to provide a heater of this class in which the air is so circulated by forced circulation that it leaves the heater near the floor and in such a position as to heat the air near the floor and spread out near the floor, thus providing for a uniform heating of the air throughout the room; third, to provide a heater of this class in which the air is forced through and around the heating portion so that it is not heated too much but leaves the heater at a reasonable temperature therefore mingling with the air in the room more uniformly; fourth, to provide a heater of this class with a novel means of circulating the air around the heating portion; fifth, to provide a heater of this class which may be placed near a wall or partition and will not burn or scorch the same; sixth to provide a novelly constructed heater of this class and seventh, to provide a heating apparatus of this class which is very simple and economical of construction, durable, efficient, and which will not readily deteriorate or get out of order.

Figure 1:
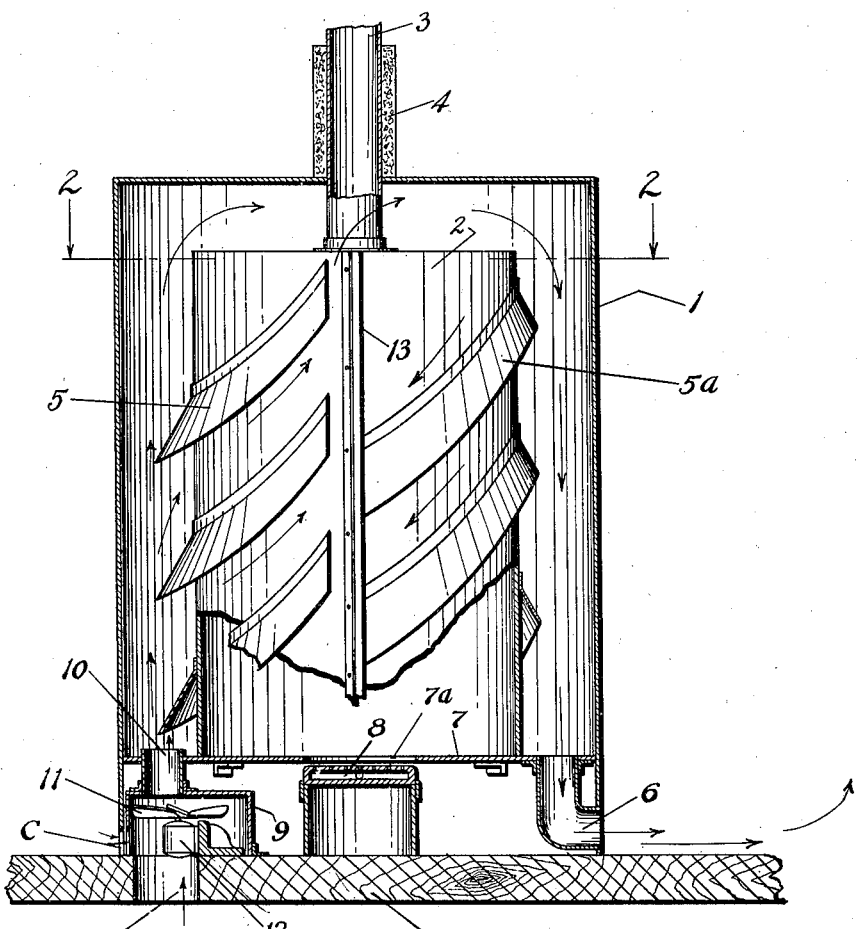
Figure 2:
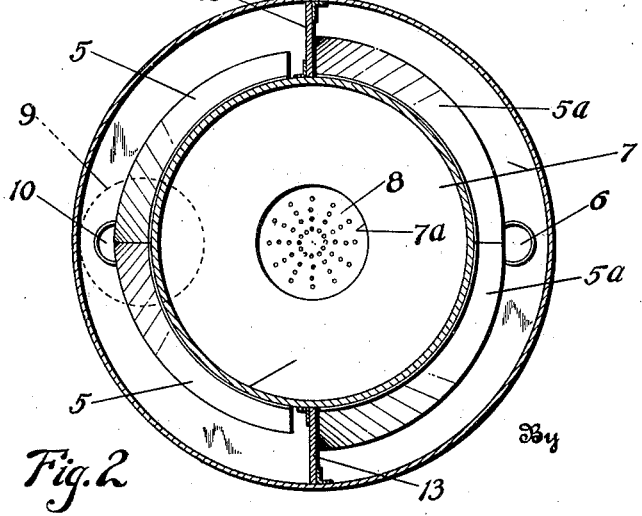

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon, which form a part of this application, in which:

Figure 1 is a vertical sectional view of my heater showing certain parts and portions in elevation to facilitate the illustration and Fig. 2 is a transverse sectional view through line 2—2 of Fig. 1.

Similar characters of reference refer to similar parts and portions throughout the views of the drawings.

The outer casing 1, inner casing 2, vent pipe 3, insulation 4, air deflectors 5 and 5ª, outlet pipe 6, horizontal partition 7, burner 8, fan casing 9, fan casing outlet 10, fan 11, motor 12 and vertical partitions 13, constitute the principal parts and portions of my heater.

The heater is preferably positioned on the floor A, in which is provided an opening B, for admitting the air from the outside. However, it will be noted that the air may be drawn through an opening C, at the sides of the casings 1 and 9 so that the air is drawn from the room which is heated if desired. The heater consists of an outer casing 1 preferably sheet metal in cylindrical form with a closed top, as shown. Positioned concentrically therein is an inner casing 2 which is of considerably smaller diameter thus providing a space between the outer surface of the casing 2 and inner surface of the casing 1. The inner casing 2 is provided centrally in its upper end with an outlet 3 for venting the interior of the casing 2, which may extend to any outlet desired. This vent 3 is provided with an insulation covering 4 surrounding the vent outlet 3 adapted for minimizing the conduction of heat from the vent pipe 3 near the casing 1. Positioned between the casings 1 and 2 are vertical partitions 13 which extend from the partition 7 upwardly to the top of the casing 2, forming two compartments connected at the top. The casing 2 is provided with flanged air deflectors 5 and 5ª, which are adapted to retard the upward movement of the air around the casing 2 and cause it to spread around the casing carrying with it the contiguous air in the space between the casings 1 and 2 in its upward and downward movement. This inner casing is positioned some distance above the floor and supported on a partition 7 which is provided with a central opening 7ª which is adapted for the burner 8. This burner 8 may be a gas or fuel oil burner or other kind of burner if desired. In this case, I have shown a gas burner with an inlet pipe 8ª extending thereto from the outside. Positioned in one side of the outer casing 1 and below the plate 7 is a fan casing 9 which is provided with an outlet 10 which extends up through the partition 7 and between the casings 1 and 2, thus providing means for conducting the air from the fan casing 9 into the space between the casings 1 and 2 at the bottom side. Mounted in this fan casing 9 is a fan 11 which is directly connected with a motor 12 for operating the same. It is noted that this fan casing in the preferred structure is mounted over the opening B in the floor A so as to draw the air from the outside. In the opposite side of the casing 1, from the fan casing 9 is an outlet conductor 6 which is the main outlet conductor for the heated air the opposite end of which extends up through the partition 7.

The operation of the heater is as follows:

The burner is lighted and the motor 12 started and the fan draws the air into the casing 9 and forces it out through the outlet 10 into the space between the casings 1 and 2 on one side of the partitions 13, where it is heated by conduction through the casing 2. This air is forced to spread around the casing 2 by means of the deflectors 5 and has a tendency to move upwardly because of its being heated but cannot pass out at the top, therefore it circulates around and to the top and then downwardly to the bottom under forced pressure which causes it to move outwardly at the floor into the room and inasmuch as the circulation is forced the air is not heated to a high temperature but is directed along the floor and intermingles with the air, thus forming a uniformly heated room.

Though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent, is:

1. In a heater of the class described, an outer casing, an inner casing spaced therefrom at the top and sides, a vertical partition between the side walls of the outer and inner casings, a burner positioned centrally in said inner casing, an inlet at one lower side between said inner and outer casings, an outlet at the opposite side at the lower side thereof and means for forcing air through the inlet, whereby air is forced upwardly on one side of the said heater and downwardly on the opposite side and exits near the floor.

2. In a heater of the class described, an outer casing, an inner casing spaced therefrom at the top and sides, a vertical partition between the side walls of the outer and inner casings, a burner positioned centrally in said inner casing, an inlet at one lower side between said inner and outer casings, an outlet at the opposite side at the lower side thereof, means for forcing air through the inlet and a circular deflector secured to said inner casing and extending part way around the same, on the opposite sides of the said partition.

3. In a heater for heating the air in rooms, an outer casing, an inner casing spaced therefrom at the top and sides, oppositely disposed partitions between the side walls of said outer and inner casings, a vent from said inner casing, a burner positioned in said inner casing, an inlet and an outlet at the lower side connecting with a space between said casings on opposite sides of said partitions and a fan for forcing air upwardly on one side through the space between said casings and downwardly through the outlet at the lower opposite side thereof, whereby the warm air exits near the floor.

4. In a heater for heating the air in rooms, an outer casing, an inner casing spaced therefrom at the top and sides, oppositely disposed partitions between the side walls of said outer and inner casings, a vent from said inner casing, a burner positioned in said inner casing, an inlet and an outlet at the lower side connecting with a space between said casings on opposite sides of said partitions, a fan for forcing air upwardly, on one side through the space between said casings and downwardly through the outlet at the lower side thereof and means for retarding the upward movement of the air between said casings and causing its circulation around the inner casing.

5. In a heater for heating air in a room, an outer casing, a partition spaced from the bottom thereof, provided with a central hole, an inner casing mounted on said partition and spaced from the inner wall of said outer casing provided with a vent at its upper end, a deflector extending only part way around said inner casing, a burner positioned so that the heat will pass through the opening into said inner casing, an inlet at the lower side between said inner and outer casings, in said partition, an outlet at the opposite lower side between said inner and outer casings in said partition and vertical partitions closing the space between said casings at opposite sides of the inner casing.

6. In a heater for heating air in a room, an outer casing, a partition spaced from the bottom thereof, provided with a central hole, an inner casing mounted on said partition and spaced from the inner wall of said outer casing provided with a vent at its upper end, a deflector extending only part way around said inner casing, a burner positioned so that the heat will pass through the opening into said inner partition, an inlet at the lower side between said inner and outer casings, an outlet at the opposite side between said inner and outer casings in said partition, vertical partitions closing the space between said casings at opposite sides of the inner casing, and a fan in a casing positioned below said partition adapted to force air into the inlet between said inner and outer casings and out through the outlet, near the floor.

7. In a heater for heating air in a room, an outer casing, a partition spaced from the bottom thereof, provided with a central hole, an inner casing mounted on said partition and spaced from the inner wall of said outer casing provided with a vent at its upper end, a deflector extending part way around said inner casing, a burner positioned so that the heat will pass through the opening into said inner partition, an inlet at the lower side between said inner and outer casings, an outlet at the opposite lower side between said inner and outer casings in said partition, vertical partitions closing the space between said casings at opposite sides of the inner casing and a fan in a casing positioned below said partition adapted to force air into the inlet between said inner and outer casings and out through the outlet, whereby, air is forced upwardly on one side of the said heater and outwardly on the opposite side and exits near the floor, and the outer casing will be relatively cool at all times.

In testimony whereof, I have hereunto set my hand at Los Angeles, California, this 18th day of May, 1925.

GEORGE E. BARNHART.